United States Patent Office 2,983,693
Patented May 9, 1961

2,983,693

ISOCYANATE TERMINATED POLYURETHANE ADHESIVE COMPOSITION

Robert J. Sievers, Valley Stream, N.Y., assignor to E. I. du Pont de Nemours and Company, Wilmington, Del., a corporation of Delaware No Drawing. Filed Dec. 20, 1956, Ser. No. 629,458

2 Claims. (Cl. 260—18)

This invention relates to a novel adhesive composition and more particularly to an adhesive composition prepared from a polytetramethyleneether glycol, an aromatic diisocyanate, and castor oil.

It is an object of the persent invention to provide a novel adhesive composition prepared from a polytetramethyleneether glycol, an aromatic diisocyanate, and castor oil. A further object is to provide a pressure-sensitive adhesive composition which has superior adhesive properties and which is adherent to a wide variety of substances. A still further object is to provide a process for the preparation of these novel adhesive compositions. Other objectives will appear hereinafter.

These and other objects of the present invention are accomplished by the adhesive compositions which are obtained by the reaction of (a) an isocyanate-terminated polyurethane of the general formula

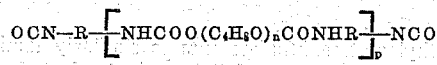

wherein R is a bivalent aromatic radical said radical being inert to isocyanate groups, $n$ is an integer so that the molecular weight of the polytetramethyleneether radical is between about 732 and 1482, and $p$ is an integer from 1 to 4; and (b) castor oil; with the ratio of the isocyanate-terminated polymer to castor oil being such that the ratio of free hydroxyl groups on the castor oil to free isocyanate groups on the isocyanate-terminated polymer is between 2.0:1 and 1.4:1. The ratio of reactants which comprise the novel compositions of the present invention is critical and, as a result, these compositions are highly useful as adhesives.

The novel compositions of the present invention may be prepared by several procedures; however, in general, they are usually prepared by first reacting a polytetramethyleneether glycol having a molecular weight of from about 750 to 1500 with a molar excess of an aromatic diisocyanate so as to form an isocyanate-terminated polyurethane. This reaction is usually carried out at a temperature of from about 70 to 100° C. for a period of from 1 to 4 hours, or until all of the hydroxyl groups of the glycol have been reacted. It is preferred to heat to about 80° C. for about 3 hours. The resulting isocyanate-terminated polyurethane is then heated to about 75 to 140° C. and subjected to a vacuum to remove any air bubbles which may be present in the mass. The vacuum is preferably less than about 5 mm. of mercury pressure. The required amount of castor oil, i.e., an amount of castor oil which will provide a ratio of free hydroxyl groups to free isocyanate groups of from 2.0:1 to 1.4:1, is added to the isocyanate-terminated polyurethane and is stirred in without incorporating air into the mass, and stirring is continued until the mass is homogeneous. The resulting composition is then ready for use as an adhesive. The reaction between the castor oil and the isocyanate-terminated polyurethane is completed by heating the composition after it has been applied to a substrate as an adhesive.

The isocyanate-terminated polyurethane which is used to prepare the novel compositions of the present invention has the general formula

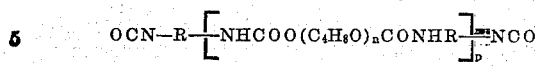

wherein R, $n$ and $p$ have the significance defined above. The polytetramethyleneether glycol which is used to prepare this polyurethane should have a molecular weight of between about 750 and 1500 in order that the resulting adhesive composition have the desired properties. When a glycol having a molecular weight below about 750 is used, the adhesive character of the resulting composition is generally unsatisfactory, while a glycol having a molecular weight above about 1500 yields compositions which are too viscous to handle.

Any aromatic diisocyanate may be used to prepare the isocyanate-terminated polyurethane, including toluene-2,4-diisocyanate, m-phenylene diisocyanate, 4-chloro-1,3-phenylene diisocyanate, 4,4'-biphenylenediisocyanate, 1,5-naphthylenediisocyanate, 1,4-tetramethylenediisocyanate, 1,4-cyclohexylenediisocyanate, 4,4'-methylenediphenylisocyanate, etc.

In the above formula, the radical R is that which is obtained from the aromatic diisocyanate and this radical has been defined as being a bivalent, aromatic radical which is inert to isocyanate groups. This limitation for the bivalent, aromatic radical is included in the definition in order to particularly point out that while the radical may contain substituents, these substituents may not be of the active hydrogen-containing type which display activity according to the Zerewitinoff test.

As mentioned above, the isocyanate-terminated polyurethane is prepared by heating the polytetramethyleneether glycol with a molar excess of the aromatic diisocyanate. This molar excess should not be greater than about 2 mols of diisocyanate to 1 mol of glycol and should not be less than about 5 mols of diisocyanate to 4 mols of glycol in order that the resulting polyurethane have the desired properties for use as a reactant in the formation of the adhesive compositions of the present invention. For purposes of the present invention, it is preferred that the isocyanate-terminated polyurethane have an isocyanate content of about 4.0 to 4.4 weight percent.

Castor oil is primarily the glyceride of ricinoleic acid and is obtainable commercially in various grades of purity and has a hydroxyl number, or acetyl value, in the range of 146–151 in the crude state. For purposes of the present invention, it is preferred that a purified castor oil having a hydroxyl number in the range of from about 160 to 165 be used. Free hydroxyl groups on the castor oil react with the free isocyanate groups of the isocyanate-terminated polyurethane to form urethane linkages and, since the castor oil is trifunctional, i.e., contains three free hydroxyl groups, it functions as a chain-extending agent and also as a cross-linking agent.

In order to provide compositions with the desired adhesive properties, the isocyanate content of the isocyanate-terminated polyurethane and the hydroxyl number of the castor oil must be determined in order that they can be mixed in the proportions so as to provide a ratio of free hydroxyl groups to free isocyanate groups of from about 2.0:1 to about 1.4:1. It has been determined that with a ratio of free hydroxyl groups to free isocyanate groups of greater than about 2.0:1, unreacted castor oil blooms to the surface of the adhesive composition and tends to reduce the adhesive properties. On the other hand, it has been determined that with a ratio of less than about 1.4:1, the adhesive properties of the resulting composition are deficient. When the ratio of reactants is in the upper part of the range, i.e., a ratio of free hydroxyl groups to free isocyanate groups of from about 1.1:1 to 2:1, the resulting composition is a pressure-sensitive adhesive; whereas in the lower part of the ratio range, i.e., a ratio of free hydroxyl groups to free isocyanate groups of from about 1.4:1 to 1.6:1, the compositions are not pressure-sensitive adhesives, but rather function as adhesives when they are heated.

The castor oil to be reacted with the isocyanate-terminated polyurethane should be at the same temperature as the polyurethane and the reaction should be carried out so that no air is incorporated into the mass. After the mass has become homogeneous, the composition is then ready for use. In general, the usable pot life of these adhesive compositions varies inversely with the temperature. The usable pot life is the time within which the composition is still useful as an adhesive in that it can be readily applied to a substrate. In general, at room temperature the pot life of these compositions is about 24 hours, while at temperatures in the range of about 130 to 140° C., the viscosity of the composition becomes too great for use as an adhesive after about 1 hour. Preparation of the adhesive composition in a solvent provides greater stability with a resulting pot life that may be as long as several weeks. In addition, when using a solvent much thinner coatings of the adhesive composition can be applied because of the lower viscosity. Suitable solvents which may be used include ketone and ester solvents in amounts of about 50% by weight of the composition.

When using the compositions of the present invention as an adhesive, the composition is coated onto a substrate, preferably using a doctor blade to regulate the amount and provide a uniform coating. When the ratio of reactants has been selected so as to provide a pressure-sensitive adhesive, the coated substrate is heated to a temperature of about 140° C. for 1 to 2 hours and is then ready as a pressure-sensitive adhesive. When the ratio of reactants is such that the composition does not yield an adhesive of the pressure-sensitive type, coating of the composition is applied to the surfaces which are to be joined and they are then placed together and the entire assembly heated to a temperature of about 140° C. for about 1 to 2 hours.

The compositions of the present invention have a wide variety of uses in that they adhere to cellulosic materials such as wood, paper, cotton fabric; to metals such as aluminum, copper, and steel; and to plastics such as polyesters. The compositions adhere excellently to polyethylene terephthalate and thus it is possible to make a strong, pressure-sensitive, adhesive polyethylene-terephthalate tape having a wide variety of applications. A particularly useful application of the compositions of the present invention as adhesives is in the formation of simple laminates wherein a film of polyethylene terephthalate or aluminum foil is bonded to a cellulosic surface such as wood, cardboard, or paper, to provide an improved surface which is variously resistant to moisture, mechanical shock, and abrasion. Cardboard or corrugated paper containers may thus be greatly upgraded by such laminating effects.

The following examples will better illustrate the nature of the present invention; however, the invention is not intended to be limited to these examples. Parts are by weight unless otherwise indicated.

Example 1

1000 parts of polytetramethyleneether glycol of molecular weight 950 and 297 parts of toluene-2,4-diisocyanate are stirred together and heated at 80° C. for 4 hours. The resulting isocyanate-terminated polyurethane analyzes 4.2% free isocyanate by weight.

100 parts of the polyurethane is then heated to 140° C. in an agitated vessel and subjected to a vacuum of 4 to 5 mm. of mercury pressure for 10 minutes to remove dissolved gas. Then there is added 68 parts of castor oil having a hydroxyl number of 165 which has previously been heated to 140° C. The reactants are then stirred without incorporating air into the mass until homogeneous.

A pressure-sensitive adhesive tape is prepared by coating the adhesive onto a polyethylene-terephthalate film using a doctor blade to obtain a thickness of about 50 mils. The coated film is heated for 1.5 hours at 140° C. to cure it. It is then cooled and rolled up using a layer of polyethylene film on the surface of the adhesive to prevent sticking to the back of the polyethylene-terephthalate film. The adhesive tape is much stronger than pressure-sensitive cellophane adhesive tape and is useful for sealing packages and cartons.

Example 2

A. 100 parts of the isocyanate-terminated polyurethane of Example 1 is heated to 140° C. and degassed under 4 to 5 mm. of mercury pressure for 10 minutes. There is then added 50 parts of castor oil having a hydroxyl number of 165, which has previously been heated at 140° C., and it is stirred in thoroughly without incorporating air into the mass. The mass is then cooled to room temperature.

B. A sheet of aluminum foil is coated with the composition, about 15 to 20 mils thickness, and a sheet of paper is similarly coated. The two coated surfaces are placed together, rolled to remove air bubbles and cured by heating at 140° C. for 1 hour. The cured laminate is much stronger than either layer separately. It is rolled up into a roll and is useful as an impervious wrapping paper. The aluminum side is turned in when wrapping moist or oil materials. The paper side is turned in for wrapping dry materials.

Polyethylene-terephthalate film is similarly laminated to paper and to aluminum foil to make laminated sheets. When tested in a Scott tester, bond strengths of about 19 pounds per inch are obtained.

When two strips of aluminum are similarly bonded and tested, bond strengths of approximately 19 to 20 pounds per inch are obtained.

A sheet of chlorosulfonated polyethylene is bonded to an aluminum sheet in the same way. The bond strength is on the order of 12 pounds per lineal inch.

Example 3

100 parts of the isocyanate-terminated polyurethane of Example 1 is mixed with 68 parts of castor oil of hydroxyl number 165 and heated to 140 C. while stirring. The mass is then cooled to about 50° C. and 100 parts of methylethyl ketone is added. Stirring is continued until a homogeneous, relatively fluid solution is obtained.

A polyethylene-terephthalate film is coated on one side with this solution by brushing it on and then letting it stand for about 1 hour for the solvent to evaporate. A sheet of aluminum foil is similarly coated. The coated sides of the two sheets are placed together and rolled to remove any trapped air. The laminate is then placed in an oven at 140° C. for 30 minutes to cure. The resulting structure requires a force of about 20 pounds per lineal inch to separate the two films when strips are tested in a Scott tester. The laminated film is useful for wrapping food for low temperature storage, the polyethylene-terephthalate providing a very tough, abrasion-resistant surface.

As many widely different embodiments of this invention may be made without departing from the spirit and scope thereof, it is to be understood that this invention is not limited to the specific embodiments thereof except as defined in the appended claims.

What is claimed is:
1. The adhesive compositions obtained by mixing at a temperature of from about 75 to 140° C. (a) an isocyanate-terminated polyurethane of the general formula

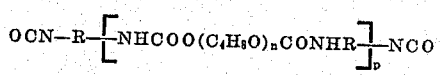

wherein R is a bivalent aromatic radical, said radical being inert to isocyanate groups, $n$ is an integer so that the molecular weight of the polytetramethyleneether radical is between about 732 and 1482, and $p$ is an integer from 1 to 4; with (b) castor oil; with the ratio of the isocyanate-terminated polyurethane to castor oil being such that the ratio of free hydroxyl groups on the castor oil to free isocyanate groups on the isocyanate-terminated polyurethane is between 2.0:1 and 1.4:1.

2. The adhesive compositions of claim 1 wherein R is a 2,4-tolylene radical.

References Cited in the file of this patent

UNITED STATES PATENTS

| | | |
|---|---|---|
| 2,764,565 | Hoppe et al. | Sept. 25, 1956 |
| 2,769,826 | Yoho | Nov. 6, 1956 |
| 2,772,245 | Simon et al. | Nov. 27, 1956 |
| 2,787,601 | Detrick et al. | Apr. 2, 1957 |
| 2,864,780 | Katz et al. | Dec. 16, 1958 |

FOREIGN PATENTS

| | | |
|---|---|---|
| 733,624 | Great Britain | July 13, 1955 |

OTHER REFERENCES

Cassias et al.: Princeton University Plastics Laboratory Technical Report, 26c, "Castor Oil-M-Tolylene Diisocyanate Polyurethane Resins and Related Modifications as Potting Compounds," pages 1–51 (pages 22 and 23 relied upon particularly), July 25, 1952.